United States Patent [19]
Christian et al.

[11] Patent Number: 4,575,201
[45] Date of Patent: Mar. 11, 1986

[54] METHOD AND APPARATUS FOR PRODUCING FOLDED OPTICAL PATH DEVICES

[75] Inventors: David E. Christian; C. Eugene McGraw, both of Danbury, Conn.; Robert Gazzero, Poway, Calif.

[73] Assignee: Burroughs Corp., Detroit, Mich.

[21] Appl. No.: 548,553

[22] Filed: Nov. 3, 1983

[51] Int. Cl.$^4$ .............................................. G02B 5/08
[52] U.S. Cl. .................................................. 350/612
[58] Field of Search ............... 350/299, 287, 288, 320, 350/612–627; 269/40, 303, 249; 264/1.7, 1.9, 261; 249/93

[56] References Cited

U.S. PATENT DOCUMENTS

| | | | |
|---|---|---|---|
| 2,420,606 | 5/1947 | McLeod et al. | 350/287 X |
| 3,175,249 | 3/1965 | Ferreira | 264/261 X |
| 4,143,869 | 3/1979 | Paterson et al. | 269/249 X |
| 4,277,141 | 7/1981 | Kleiber | 350/299 |
| 4,367,014 | 1/1983 | Howden | 350/299 X |

FOREIGN PATENT DOCUMENTS 0924998 3/1947 France .......................... 350/252

Primary Examiner—John K. Corbin
Assistant Examiner—Vincent J. Lemmo
Attorney, Agent, or Firm—Mark T. Starr; Kevin R. Peterson

[57] ABSTRACT

Disclosed is a method and apparatus for the lowcost assembly of precision optical devices utilizing single or multiple bounces. The apparatus makes use of a precision machined alignment platform to support optical mirrors in precise alignment. A low cost holding structure is clamped over the alignment platform to position one of a plurality of connected sections adjacent to the back of each mirror. An adhesive is injected through holes provided in the holding structure adjacent to the back of each mirror. The adhesive bridges each mirror to the holding structure in a position corresponding exactly to the position of the mirrors on the alignment platform, thereby eliminating any need to adjust the mirrors for correct alignment.

19 Claims, 7 Drawing Figures

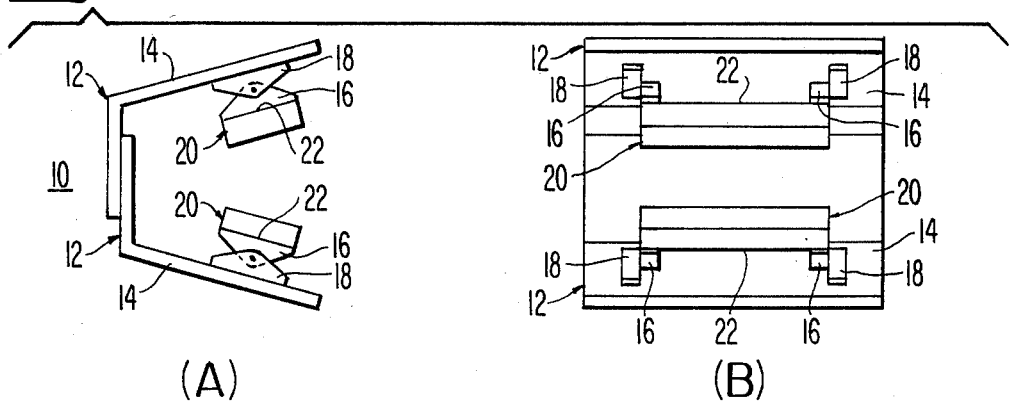
Fig./ PRIOR ART
(A)    (B)
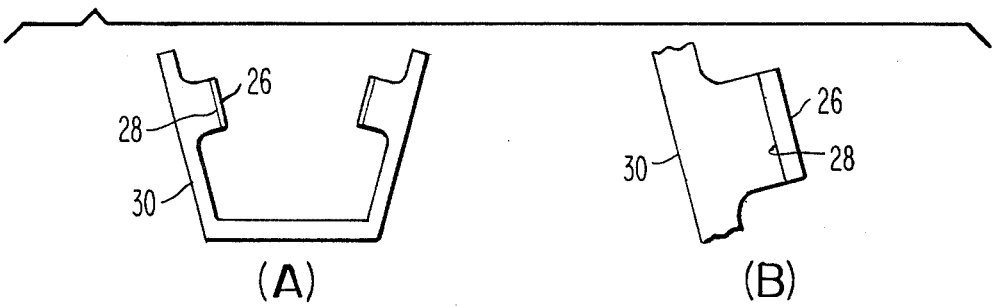
Fig.2 PRIOR ART
(A)    (B)
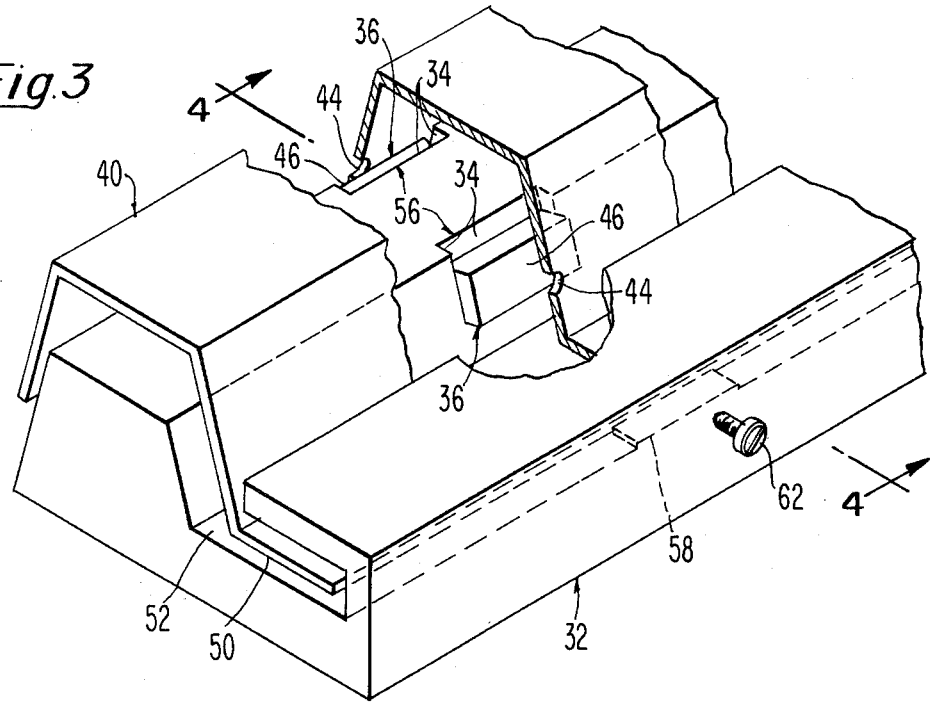
Fig.3

METHOD AND APPARATUS FOR PRODUCING FOLDED OPTICAL PATH DEVICES

BACKGROUND OF THE INVENTION

A. Field of the Invention

This invention relates in general to an apparatus and method for assembling optical path folding devices. More particularly, the present invention relates to an apparatus and method for manufacturing low cost, precision optical devices which utilize single or multiple bounces.

B. Prior Art

In the prior art, various assemblies have been utilized to mount and align optical mirrors for use in single or multiple bounce optical path folding devices.

FIG. 1 shows one prior art system utilized to mount and align mirrors. In this system, the assembly 10 is formed from two identical subassemblies 12 which are joined together by appropriate means along the overlapping portions of frame members 14. A mirror holding member 16 is pivotably mounted to support 18 as shown. A mirror 20 is bonded to each mirror holding member 16 by means of a suitable adhesive 22. In such a prior art system, each mirror 20 may be pivoted in order to achieve accurate optical alignment.

The prior art system of FIG. 1 suffers from two major drawbacks. The system is mechanically complex and its production cost is not appropriate for use in low cost optical systems. The second drawback is in the time consuming and therefore costly alignment procedures required to achieve accurate optical alignment of the mirrors 20.

FIG. 2 shows another prior art system known as replication. Replication is typically used in precision optic devices where repeatability and large production quantities are required. In this system, a reflective coating 26 is bonded via an adhesive to a precision machined surface 28 on holding structure 30. The reflective coating 26 is very thin and of a uniform thickness. The quality of the surface 28 reflects the quality of the mirrored surface obtained after the reflective coating 26 is bonded to surface 28. Therefore, the surface 28 to which the coating 26 is bonded must be accurately machined to assure optical alignment of the completed assembly. The main drawback of replication is that the process is costly and time consuming.

It is the general object of the present invention to overcome the above-mentioned drawbacks of the prior art by providing an improved apparatus and method for assembling folded optical path folded mirror systems.

It is another object of the present invention to provide a repeatable and low cost method and apparatus for producing precision aligned folded optical path mirror systems.

It is a further object of the present invention to provide a method and apparatus for assembling folded optical path mirror optical systems without the need to adjust the mirrors for proper alignment.

It is an additional object of the present invention to provide an apparatus and method for producing optical mirror systems utilizing inexpensive mechanical substrates.

These and other objects, features and advantages of the present invention will become more apparent from the detailed description of the preferred embodiment when read in conjunction with the drawings.

SUMMARY OF THE INVENTION

According to the invention, a system and method is provided for mounting optical mirrors to a holding structure without the need for adjusting the mirrors to obtain optical alignment.

The system includes an alignment platform having precision machined recesses to support a plurality of mirrors in precise optical alignment with each other. A holding structure is positioned over the alignment platform and clamped against a reference surface of the alignment platform. The holding structure includes connected sections which are thereby positioned adjacent to, but not in contact with the backs of the mirrors.

A hole is provided in the holding structure section adjacent to the back of each mirror. An adhesive is injected through each hole and bridges the gap between the back of each mirror and the adjacent holding structure section. After the adhesive cures, the clamp is released and the assembled holding structure is removed.

In the completed holding structure, the mirrors are permanently connected to the holding structure in precise optical alignment with each other. At this point, the completed holding structure is ready for installation in the optical system of a using device.

BRIEF DESCRIPTION OF THE DRAWINGS

FIG. 1A is a side view of a prior art system used to mount and align mirrors.

FIG. 1B is a front view of the prior art system of FIG. 1A.

FIG. 2A is a side view of the prior art replication system used to produce precision optic devices.

FIG. 2B is an enlarged view of a portion of FIG. 2A.

FIG. 3 is a pictorial view of the present system for producing aligned optical systems.

DESCRIPTION OF THE PREFERRED EMBODIMENT

The present invention provides a system for mounting optical mirrors on a holding unit. The mirrors are mounted in the exact position required for use in a using optical system, such as a folded mirror system used in some facsimile equipment or a camera-like scanner for digitizing images from a sheet of paper. The assembled holding unit is designed to be installed within the using optical system.

Figure 4:
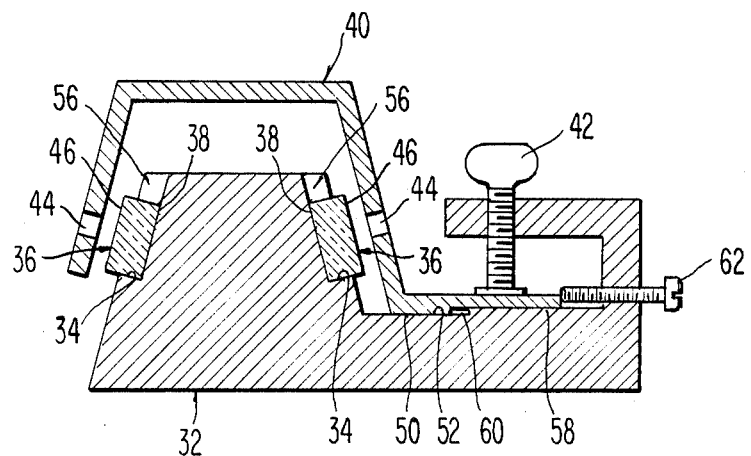
FIG. 4 is a section view of FIG. 3 taken along the lines 4—4.
Figure 5:
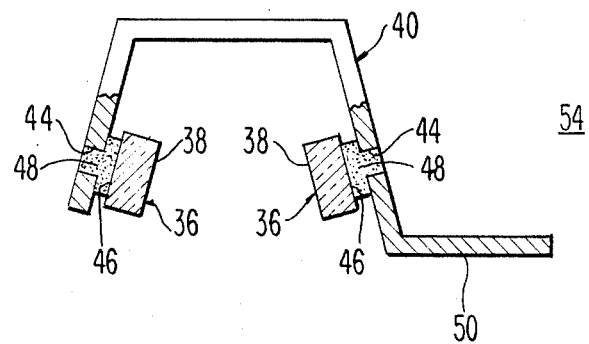
FIG. 5 is a side view, with portion broken away, of the assembled mirror holding structure produced by the present system.

FIGS. 3 and 4 show the preferred embodiment of the alignment/assembly system of the present invention. FIG. 5 shows a completely assembled and aligned holding unit ready for installation in the using optical system.

The key element of the alignment/assembly system is alignment platform 32. Alignment platform 32 may be fabricated from steel or another suitable material which is not susceptible to warping. Cavities 56 in platform 32 are positioned to support a pair of mirrors 36 in correct alignment with each other in accordance with the requirements of the using optical system in which the assembled holding unit will be installed. Those skilled in the art will therefore appreciate that the positions of the mirrors 36 will vary depending on the using optical system the completed holding unit will be installed in.

The mirrors 36 are placed in the cavities 56 with their reflective surfaces 38 facing inward as shown. The mirrors 36 are supported in their aligned positions by the surfaces 34 of cavities 56. No additional means are utilized to hold the mirrors 36 on the platform 32. The surfaces 34 of cavities 56 are precisely machined so that the mirrors 36 are supported at the exact optical alignment required by the optical system in which they will be used.

After the mirrors 36 are positioned on platform 32, a mirror holding structure 40 is positioned over the platform 32. The holding structure 40, after having the mirrors 36 mounted to it, will provide an optically aligned mirror subsystem which can then be installed in a using device as part or all of its optical system. In the preferred embodiment, the holding structure 40 is fabricated from extruded aluminum. However, those skilled in the art will appreciate that the holding structure may alternatively be fabricated from sheet metal or other suitable materials.

In the preferred embodiment, the holding structure 40 is longitudinally aligned with the alignment platform 32 via a bar shaped member 58 on the surface 52 of platform 32 which mates with a slot 60 in the base 50 of holding unit 40. The holding structure 40 is thus positioned on the platform 32 with slot 60 and bar 58 slidably mated. In such a position, the holding structure 40 is longitudinally fixed with respect to the platform 32, but may be slid back and forth in the orthogonal direction.

Screw 62 provides a stop against which the holding unit 40 may be slid in order to achieve equal spacing between the backs 46 of mirrors 36 and the adjacent sides of holding structure 40. In practice, screw 62 need only be adjusted the first time a set of mirrors 36 is mounted to a holding structure 40.

Those skilled in the art will appreciate that alternate mechanisms may be utilized to longitudinally align the holding structure with respect to platform 32 and to achieve equal spacing.

With the holding structure 40 positioned over the platform 32 as shown in FIGS. 3 and 4, clamp 42 is engaged to securely hold the holding structure 40 at the required longitudinal alignment and spacing. Next, a suitable adhesive 48 is injected through holes 44 which pass through the holding structure 40. A sufficient quantity of adhesive 48 is injected to bridge the gaps between the surfaces 46 of mirrors 36 and the opposed surface of holding structure 40. In the preferred embodiment, a urethane adhesive is utilized. The adhesive 48 is then allowed to cure, after which the clamp 42 is loosened and the completed holding structure 54 (FIG. 5) is removed from the platform 32.

As shown in FIG. 5, the mirrors 36 are permanently mounted to the completed holding structure 54 in the precise optical alignment required by the using optical system. Therefore, no further adjustment of the mirrors 36 is required in order for them to be in alignment. The completed holding structure 54 is now ready for installation in the using device.

It should be appreciated that the holding structure 40 need not be precisely machined since it does not effect the alignment of the mirrors. Instead, the holding structure indirectly supports the mirrors 36 which are in alignment due the adhesive 48 filling the gaps between the prealigned mirrors 36 and the holding structure 40.

Those skilled in the art will appreciate that if the clamping surface 52 of platform 32 is used as the reference surface for machining the remainder of the platform 32, then the surface 50 of holding structure 40 will be precisely located with respect to the mirror surfaces 38. This will allow the surface 50 of the holding structure 40 to be used for mounting other components in the optical path of the using system.

Although the preferred embodiment has only considered a system for assembling a holding system employing two mirrors 36, those skilled in the art will appreciate that the system may readily be modified to facilitate the mounting and alignment of a single mirror or more than two mirrors at various positions required for optical alignment in the using system.

Further, those skilled in the art will appreciate that the system may be used to mount both optical and nonoptical elements in addition to mirrors.

Having shown and described the preferred embodiment of the present invention, those skilled in the art will realize that various omissions, substitutions and changes in forms and details may be made without departing from the spirit of the invention. It is the intention, therefore, for the invention to be limited only as indicated by the scope of the following claims.

What is claimed is:

1. A system for mounting optical elements, comprising:

alignment platform means for supporting said optical elements;

holding means for retaining said optical elements, mountable on said alignment platform means, said holding means including means for accepting a bridging means, said bridging means for interconnecting said optical elements and said holding means;

wherein said alignment platform means includes
   means for positioning and supporting said optical elements in an aligned position, and
   means for clamping said holding means on said alignment platform means;

wherein said holding means includes a frame, said frame including an intermediate section and first and second leg sections respectively connected to the ends of the intermediate section and angularly disposed with respect thereto, said frame mountable over said alignment platform means with each of said frame's leg sections adjacent to and in spaced relationship with one of said optical elements;

wherein said bridging means is an adhesive; and wherein a hole passes through each of said leg sections at a point opposite its respective optical element, whereby said adhesive may be injected through each of said holes to bridge the space between and thereby join together each of said leg sections and its respective optical element.

2. A system for mounting optical elements, comprising:

alignment platform means for supporting said optical elements;

holding means for retaining said optical elements, mountable on said alignment platform means, said holding means including means for accepting a bridging means, said bridging means for interconnecting said optical elements and said holding means; and means for longitudinally aligning said holding means with said alignment platform means, wherein said alignment platform means includes means for positioning and supporting said optical elements in an aligned position, and means for clamping said holding means on said alignment platform means.

3. The system in accordance with claims 1 or 2 wherein said positioning means includes a member having a first recess, wherein a first one of said optical elements may be inserted into said first recess and thereby be supported and held in said aligned position by said first recess.

4. The system in accordance with claim 3 wherein said member has a second recess, wherein a second one of said optical elements may be inserted into said second recess and thereby be supported in said aligned position by said second recess.

5. The system in accordance with claim 4 wherein said first and second recesses are positioned with respect to each other such that said first and second optical elements are optically aligned.

6. The system in accordance with claim 5 wherein a surface of each of said first and second recesses is precision machined to the exact tolerances required to obtain optical alignment of the optical elements.

7. The system in accordance with claim 3 wherein said first recess has a first semivertical backwall, a first connected semihorizontal platform and two connected semivertical sidewalls.

8. The system according to claim 1 further including means for longitudinally aligning said holding means with said alignment platform means.

9. The system according to claim 2 wherein said holding means includes:

a frame having a first side, said first side positioned adjacent to and in spaced relationship with a first one of said optical elements when said holding means is mounted on said alignment platform means;

wherein said bridging means is an adhesive; and wherein a first hole passes through said first side at a point opposite said first optical element, whereby said adhesive may be injected through said first hole to bridge together said first side and said first optical element and thereby secure said first optical element.

10. The system in accordance with claim 8 further including means for adjusting the amount of space between said first side and said first optical element.

11. The system in accordance with claim 8 wherein said first optical element is a mirror.

12. The system according to claim 2 wherein said holding means includes a frame, said frame including an intermediate section and first and second leg sections respectively connected to the ends of the intermediate section and angularly disposed with respect thereto, said frame mountable over said alignment platform means with each of said leg sections adjacent to and in spaced relationship with one of said optical elements;

wherein said bridging means is an adhesive; and wherein a hole passes through each of said leg sections at a point opposite its respective optical element, whereby said adhesive may be injected through each of said holes to bridge the space between and thereby join together each of said leg sections and its respective optical element.

13. The system in accordance with 12 wherein each of said optical elements is a mirror.

14. The system in accordance with claim 13 wherein said frame further includes a clamping section extending from the distal end of one of said leg sections, said clamping section engaged by said clamping means to hold said holding means on said alignment platform means, said clamping section having a groove in its bottom, said groove slidably mating with a bar mounted on said alignment platform means.

15. An assembly for holding at least two optical elements in precise alignment, comprising:

a frame including an intermediate section and first and second leg sections respectively coupled to the ends of the intermediate section and angularly disposed with respect thereto, each one of said optical elements positioned in spaced relationship adjacent to an inner surface of one of the leg sections, each of said optical elements held in said spaced relationship by a quantity of adhesive, said adhesive filling the space between each of said optical elements and its adjacent leg section; and wherein each of said leg sections has a hole through it, each of said holes adjacent to its respective optical element, each of said holes for receiving said adhesive, said adhesive injected into each of said holes so it flows through the hole and bridges the space between each of said leg sections and its respective optical element.

16. The assembly in accordance with claim 15 wherein each of said optical elements is a mirror, a back side of each mirror facing an inner surface of each mirror's adjacent leg, each of said mirrors positioned so it is optically aligned.

17. A system for mounting optical elements, comprising:

alignment platform means for supporting said optical elements; and holding means for retaining said optical elements, mountable on said alignment platform means, said holding means including means for accepting an adhesive, said adhesive for interconnecting said optical elements and said holding means, said holding means including a frame, said frame including an intermediate section and first and second leg sections respectively connected to the ends of the intermediate section and angularly disposed with respect thereto, said frame mountable over said alignment platform means with each of said leg sections adjacent to and in spaced relationship with one of said optical elements, and wherein a hole passes through each of said leg sections at a point opposite the respective one of said optical elements, whereby said adhesive may be injected through each of said holes to bridge the space between and thereby join together each of said leg sections and the respective one of said optical elements.

18. A method of connecting a plurality of optical elements to a holding frame, said method comprising the steps of:

a. positioning said optical elements on an alignment platform so they are in optical alignment;

b. positioning said holding frame over and in spaced relationship to said aligned optical elements;

c. longitudinally aligning said holding frame with respect to said alignment platform such that each of a plurality of holes in said holding frame, corresponding in number to said plurality of optical elements, is positioned at a point opposite one of said optical elements;

d. clamping said holding frame in the longitudinally aligned position; and e. injecting an adhesive through each of said holes in the holding frame so that the adhesive flows between each of said optical elements and an adjacent section of said holding frame.

19. The method in accordance with claim 18, further including the following additional steps after said step e:

f. allowing said adhesive to cure;

g. unclamping said holding frame.

* * * * *

UNITED STATES PATENT AND TRADEMARK OFFICE
CERTIFICATE OF CORRECTION

PATENT NO. : 4,575,201
DATED : March 11, 1986
INVENTOR(S) : David E. Christian et al.

It is certified that error appears in the above-identified patent and that said Letters Patent are hereby corrected as shown below:

Col. 3, line 65, after "due" insert --to--.
Claim 4, line 14, after "supported" insert --and held--.
Claim 10, line 45, change "8" to --9--.
Claim 11, line 48, change "8" to --9--.

Signed and Sealed this

Seventeenth Day of June 1986

[SEAL]

Attest:

DONALD J. QUIGG

Attesting Officer

Commissioner of Patents and Trademarks